(12) United States Patent
McCormick (10) Patent No.: US 11,596,148 B2
(45) Date of Patent: Mar. 7, 2023

(54) DRY VAPOR CRYOGENIC CONTAINER WITH ABSORBENT CORE

(71) Applicant: Savsu Technologies, Inc., Old Bethpage, NY (US)

(72) Inventor: Bruce McCormick, Sante Fe, NM (US)

(73) Assignee: SAVSU TECHNOLOGIES, INC., Old Bethpage, NY (US)

( * ) Notice: Subject to any disclaimer, the term of this patent is extended or adjusted under 35 U.S.C. 154(b) by 495 days.

(21) Appl. No.: 16/192,925

(22) Filed: Nov. 16, 2018

(65) Prior Publication Data

US 2019/0150427 A1    May 23, 2019

Related U.S. Application Data

(60) Provisional application No. 62/587,857, filed on Nov. 17, 2017.

(51) Int. Cl.
| | | |
|---|---|---|
| *A01N 1/02* | (2006.01) | |
| *F25D 3/10* | (2006.01) | |
| *F17C 3/04* | (2006.01) | |
| *F17C 3/08* | (2006.01) | |
| *F17C 11/00* | (2006.01) | |

(52) U.S. Cl.
CPC ......... *A01N 1/0273* (2013.01); *A01N 1/0257* (2013.01); *F17C 3/04* (2013.01); *F17C 3/08* (2013.01); *F17C 11/00* (2013.01); *F25D 3/105* (2013.01); *F17C 2201/0119* (2013.01); *F17C 2203/0325* (2013.01);

(Continued)

(58) Field of Classification Search
CPC .. A01N 1/0273; A01N 1/0257; A01N 1/0236; A01N 1/0242; A01N 1/0268; A01N 1/0284; F25D 3/105; F17C 3/04; F17C 3/08; F17C 11/00; F17C 2201/0119

See application file for complete search history.

(56) References Cited

U.S. PATENT DOCUMENTS

| | | |
|---|---|---|
| 2,106,828 A | 2/1938 | Chappell |
| 2,897,657 A | 8/1959 | Rupp |

(Continued)

FOREIGN PATENT DOCUMENTS

| | | |
|---|---|---|
| CN | 102288510 B | 11/2012 |
| WO | 2002053967 A1 | 7/2002 |

OTHER PUBLICATIONS

International Search Report for PCT/US 18/61484, dated Feb. 1, 2019.

*Primary Examiner* — Brian M King
(74) *Attorney, Agent, or Firm* — Brown & Michaels, PC (57) ABSTRACT

A dry vapor cryogenic storage container includes an absorbent core made from a porous material that absorbs a liquid cryogen and releases the cryogen in vapor form as the absorbed liquid evaporates. Fluid channels are formed in the absorbent core to increase the available surface area through which the liquid cryogen can be absorbed. The core can absorb the cryogenic liquid much faster with inclusion of the fluid channels. The absorbent core can be made by cutting a cavity and drilling holes in a stack of calcium silicate panels. The cavity holds a contents container or an inner core. The inner core can be part of an extractor and made from porous material including fluid channels for absorbing liquid cryogen. Contents containers can be housed in the inner core.

23 Claims, 6 Drawing Sheets

(52) U.S. Cl.
CPC ..... *F17C 2203/0333* (2013.01); *F17C 2221/014* (2013.01); *F17C 2270/02* (2013.01)

(56) References Cited

U.S. PATENT DOCUMENTS

| | | | |
|---|---|---|---|
| 3,215,313 A | 11/1965 | Stelts | |
| 3,261,087 A | 7/1966 | Maurice | |
| 3,420,363 A | 1/1969 | Blickensderfer | |
| 3,765,558 A | 10/1973 | Withers | |
| 4,835,975 A | 6/1989 | Windecker | |
| 5,060,481 A | 10/1991 | Bartlett et al. | |
| 5,338,766 A | 8/1994 | Phan et al. | |
| 5,386,706 A | 2/1995 | Bergsten et al. | |
| 5,419,143 A * | 5/1995 | Leonard | B01L 7/04 62/46.3 |
| 5,906,101 A * | 5/1999 | Rajotte | F25D 25/00 62/51.1 |
| 6,087,581 A | 7/2000 | Emmer et al. | |
| 6,209,343 B1 | 4/2001 | Owen | |
| 6,539,726 B2 * | 4/2003 | Giesy | F17C 3/02 206/0.7 |
| 6,655,156 B1 | 12/2003 | Miksic et al. | |
| 7,299,650 B1 | 11/2007 | Romanos et al. | |
| 7,862,646 B2 * | 1/2011 | Carruthers | B01J 20/28011 95/131 |
| 8,151,599 B2 * | 4/2012 | Sixt | B65D 81/3816 62/457.2 |
| 8,770,907 B2 * | 7/2014 | Yoshimura | A01N 1/0263 414/225.01 |
| 8,887,944 B2 * | 11/2014 | Deane | B65D 81/3818 220/592.26 |
| 9,205,969 B2 * | 12/2015 | Deane | B65D 81/3823 |
| 10,329,158 B2 * | 6/2019 | Dementhon | B01J 20/28042 |
| 2002/0065627 A1 | 5/2002 | Neeser et al. | |
| 2002/0084277 A1 | 7/2002 | Mullens et al. | |
| 2004/0091654 A1 | 5/2004 | Kelly et al. | |
| 2010/0299278 A1 | 11/2010 | Kriss et al. | |
| 2012/0000918 A1 * | 1/2012 | Deane | B65D 81/3811 220/592.2 |
| 2015/0345691 A1 | 12/2015 | Sagnard et al. | |
| 2016/0318694 A1 | 11/2016 | Mitchell et al. | |
| 2017/0343264 A1 | 11/2017 | McCormick | |
| 2018/0022073 A1 | 1/2018 | Sasaki et al. | |
| 2018/0112823 A1 | 4/2018 | Ducloy et al. | |
| 2018/0356040 A1 * | 12/2018 | Gillia | C01B 3/0026 |

* cited by examiner

DRY VAPOR CRYOGENIC CONTAINER WITH ABSORBENT CORE

TECHNICAL FIELD

The present disclosure relates generally to insulated storage containers and, in particular, to cryogenic storage containers and components.

BACKGROUND

Advancements in cryogenic storage containers, particularly cryogenic shipping containers, include containers designed to minimize loss of liquid cryogen during shipping. U.S. Patent Application Publication No. 2017/0343264 by McCormick represents one such advancement and discloses a dry vapor storage and shipping container in which a porous material is employed to absorb liquid cryogen into walls facing a storage cavity of the container. This prevents the liquid cryogen from coming into direct contact with the contents being stored in the storage cavity and from sloshing around inside the container during transport while also keeping the storage cavity sufficiently cool via release of vaporized cryogen into the storage cavity.

SUMMARY

In accordance with various embodiments, a dry vapor cryogenic storage container includes one or more thermally insulated walls, an absorbent core, a storage cavity, and a plurality of fluid channels. The one or more thermally insulated walls together partly define a closable container volume having an open end and an opposite closed end. The absorbent core is housed in the container volume and includes a porous material that absorbs a cryogenic material in liquid form and releases the cryogenic material in vapor form as the absorbed liquid evaporates. The storage cavity is formed in the absorbent core and is sized and shaped to hold a contents container in contact with the porous material such that the contents container remains stationary within the absorbent core when the orientation of the storage container changes. The fluid channels are formed in the absorbent core. Each fluid channel has an open end at an outer surface of the absorbent core and extends into the porous material. Liquid cryogenic material in the container volume is absorbed into the porous material through fluid channel surfaces.

In some embodiments, the absorbent core comprises a plurality of panels formed from the porous material. The panels are held together in a stacked configuration in the container volume. Each panel has a plurality of apertures formed therethrough such that the apertures of each panel are aligned with apertures of an adjacent panel to define at least portions of the plurality of fluid channels.

In some embodiments, each panel of the absorbent core has a storage cavity opening formed therein such that the storage cavity opening of each panel circumscribes and partly defines the storage cavity of the absorbent core.

In some embodiments, the absorbent core further comprises a holder extending from a first end to an opposite second end of the absorbent core. The holder is configured to independently maintain a stacked configuration of panels.

In some embodiments, the holder includes one or more fasteners extending between the first and second ends of the absorbent core through aligned apertures of the panels.

In some embodiments, the porous material is calcium silicate.

In some embodiments, each fluid channel is formed in a non-cavity area of the absorbent core defined between an outer perimeter of the storage cavity and an outer perimeter of the absorbent core. A total area of the open ends of the fluid channels is in a range from 5% to 25% of the non-cavity area.

In some embodiments, a surface area along one of the fluid channels is greater than 20% of the non-cavity area of the absorbent core.

In some embodiments, a combined surface area along all of the plurality of fluid channels is at least an order of magnitude greater than the non-cavity area.

In some embodiments, a combined surface area along all of the plurality of fluid channels is at least twice a surface area of the storage cavity.

In some embodiments, the absorbent core is a removable and replaceable component of the storage container.

In some embodiments, the storage cavity is lined with a shock absorbent material.

In some embodiments, the storage container includes a temperature sensor embedded in the absorbent core.

In some embodiments, at least one of the fluid channels has an open end at the storage cavity.

In some embodiments, the absorbent core includes an outer core with a cavity formed therein and an inner core formed from the porous material. The inner core removably fits within the cavity of the outer core. The storage cavity and at least some of the fluid channels are defined in the inner core.

In some embodiments, both of the inner and outer cores include the porous material and have at least some of the fluid channels formed therein.

In some embodiments, the fluid channels formed in the inner core are perpendicular with the fluid channels formed in the outer core.

In some embodiments, the storage container includes an extractor that includes the inner core and a plate attached at an end of the inner core. The plate is in contact with an end of the outer core when the inner core is in the cavity of the outer core.

In some embodiments, the storage cavity is one of a plurality of storage cavities configured to hold individual contents containers in contact with the porous material such that each contents container remains stationary within the respective storage cavity when the orientation of the storage cavity changes.

In accordance with various embodiments, a dry vapor cryogenic storage container includes a base, a lid, an outer core, an extractor, and a storage cavity. The base has super-insulated walls, and the lid fits on the base. The base and lid together define a container volume of the storage container. The outer core is sized and shaped to fit within the container volume such that an outer surface of the outer core is in contact with the super-insulated walls and such that the outer core remains stationary within the container volume when the orientation of the storage container changes. The outer core has a cavity facing the lid. The extractor includes an inner core and a handle attached at an end of the inner core. The inner core is sized and shaped to removably fit within the cavity. The handle is foldable to lie along the end of the inner core when the inner core is in the cavity. The storage cavity is formed in the inner core and is sized and shaped to hold a contents container in contact with the inner core such that the contents container remains stationary within the storage cavity when the orientation of the storage cavity changes. One or both of the inner and outer cores includes a panel of porous material that absorbs a cryogenic material in liquid form and releases the cryogenic material in vapor form as the absorbed liquid evaporates. A plurality of fluid channels is formed in the porous material. Each fluid channel has an open end at an outer surface of one of the cores. Liquid cryogenic material is absorbed into the porous material through fluid channel surfaces.

It is contemplated that any number of the individual features of the above-described embodiments and of any other embodiments depicted in the drawings or description below can be combined in any combination to define an invention, except where features are incompatible.

BRIEF DESCRIPTION OF THE DRAWINGS

One or more embodiments will hereinafter be described in conjunction with the appended drawings, wherein like designations denote like elements, and wherein.

DESCRIPTION OF EMBODIMENTS

Described below is an advancement in the art of cryogenic storage containers. Fluid channels are formed in an absorbent core as part of a cryogenic container. The core is made from a porous material that absorbs a liquid cryogen and releases vaporized cryogen. The fluid channels increase the available surface area through which the liquid cryogen can be absorbed without compromising other functions of the core, such as its ability to protect and hold the stored contents in place during shipping, associated shocks, and orientation changes. The core can absorb the cryogenic liquid much faster with inclusion of the fluid channels, requiring only minutes rather than hours or days for the porous material to become completely saturated with the liquid cryogen. The absorbent core can be used to convert a conventional cryogenic dewar into a dry vapor cryogenic storage container useful for shipping.

Figure 1:
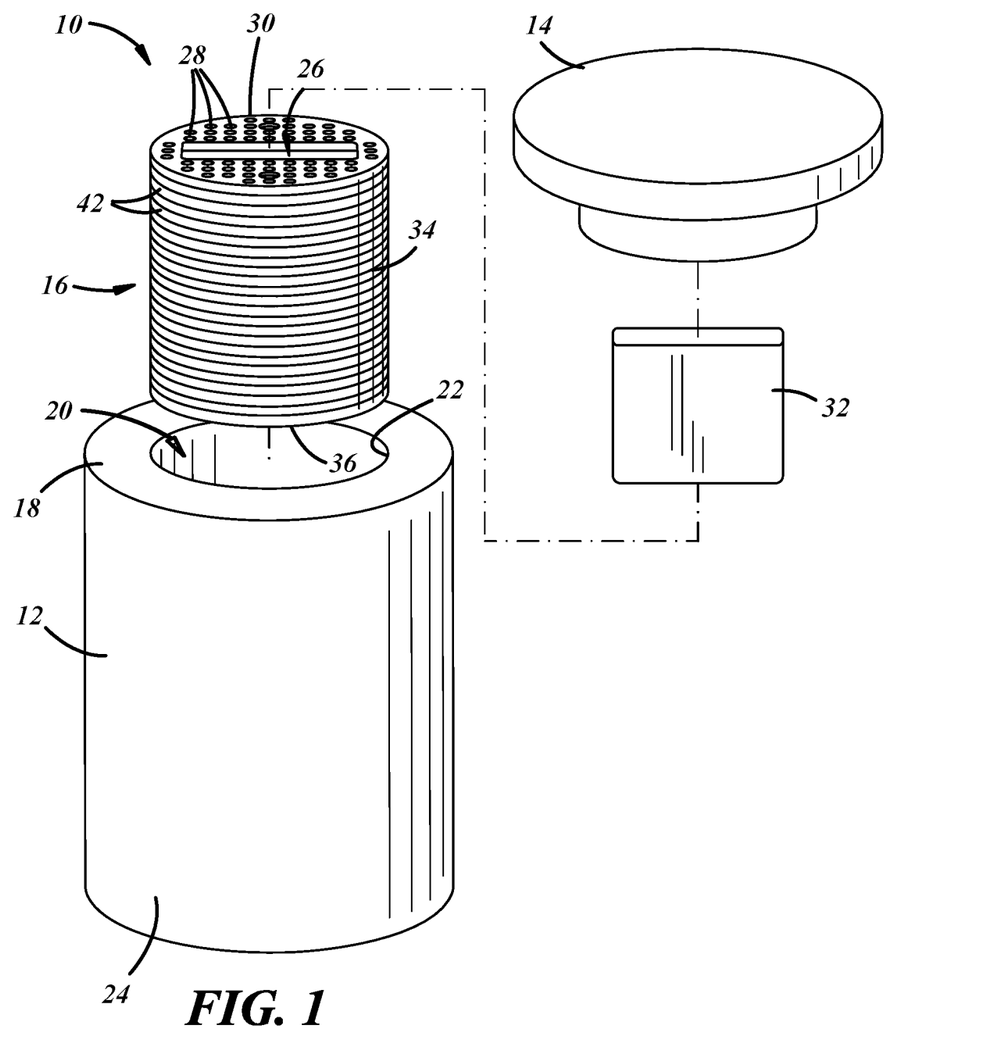
FIG. 1 is an exploded view of a dry vapor cryogenic storage container that includes a constructed absorbent core (CAC)

FIG. 1 is an exploded view of an example of a dry vapor cryogenic storage container 10 that includes a base 12, a lid 14, and an absorbent core 16. The base 12 includes one or more thermally insulated walls 18 that, together with the lid 14, define a container volume 20 of the storage container 10. With the lid 14 removed, the container volume 20 has an open end 22 and an opposite closed end 24. The absorbent core 16 is constructed primarily from a porous material that absorbs liquid cryogen and release gaseous cryogen as the liquid evaporates. The core 16 is housed and fits within the container volume 20 and has a close fit with the walls 18, being in contact with the horizontal bottom of the base 12 and with the surrounding vertical walls. The absorbent core 16 may be sized and shaped to fit within the container volume 20 and to contact the walls 18 such that the core remains stationary within the container volume 20 when the orientation of the storage container 10 changes. In other words, the absorbent core 16 has a sufficiently close fit with the base 12 that the container 10 can be jostled, inverted, tipped on its side, etc. without the core moving with respect to the base 12. In some embodiments, the absorbent core 16 is essentially the same size and shape as the container volume 20. The core 16 can have a slip fit with the base 12 and be a removable and replaceable component of the container 10, or the core can be a permanent part of the container.

A storage cavity 26 and a plurality of fluid channels 28 are formed in the absorbent core 16. In this case, the cavity 26 and the fluid channels 28 each open along a first end 30 of the absorbent core 16 at the open end 22 of the container volume 20. The storage cavity 26 is sized and shaped to removably receive and hold a contents container 32 in contact with the absorbent core 16 such that the contents container remains stationary within the container volume 20 when the orientation of the storage container 10 changes. In other words, the contents container 32 has a sufficiently close fit with the core 16 when in the storage cavity 26 that the storage container 10 can be jostled, inverted, tipped on its side, etc. without the contents container 32 moving with respect to the base 12. In some embodiments, the storage cavity 26 is essentially the same size and shape as the contents container and/or dimensioned to allow the contents container 32 to be manually placed in and removed from the storage cavity and so that the contents container does not fall out of the storage cavity when inverted. Alternatively, the storage cavity 26 may be formed elsewhere along the outer surface of the absorbent core 16, the core may include more than one storage cavity, or the storage cavity 26 may be fully enclosed within the core 16, such as with a multi-piece core.

The contents container 32 is configured to hold the items intended for cryogenic storage or shipment, such as certain biological or life science products. The contents container 32 can be in the form of a vial, cassette, or other closable container. The contents container 32 may be a fully-sealed container able to withstand temperatures lower than −150° C. for several hours. The contents container 32 is at least partially enclosed by the storage cavity 26, and movement of the contents container 18 relative to the absorbent core 16 may be restricted in all directions via a tight fit with the storage cavity or by the storage cavity in combination with the lid 14. Preferably, movement of contents container 32 is restricted such that it remains stationary relative to the core 16 even in the absence of the base bottom 12 and lid 14. An extraction device or tool (not shown) may be included, such as a wire or cable that extends from the bottom to the top of the contents container 32 along a storage cavity wall to help a user remove the contents container from the storage cavity 26.

Figure 2:
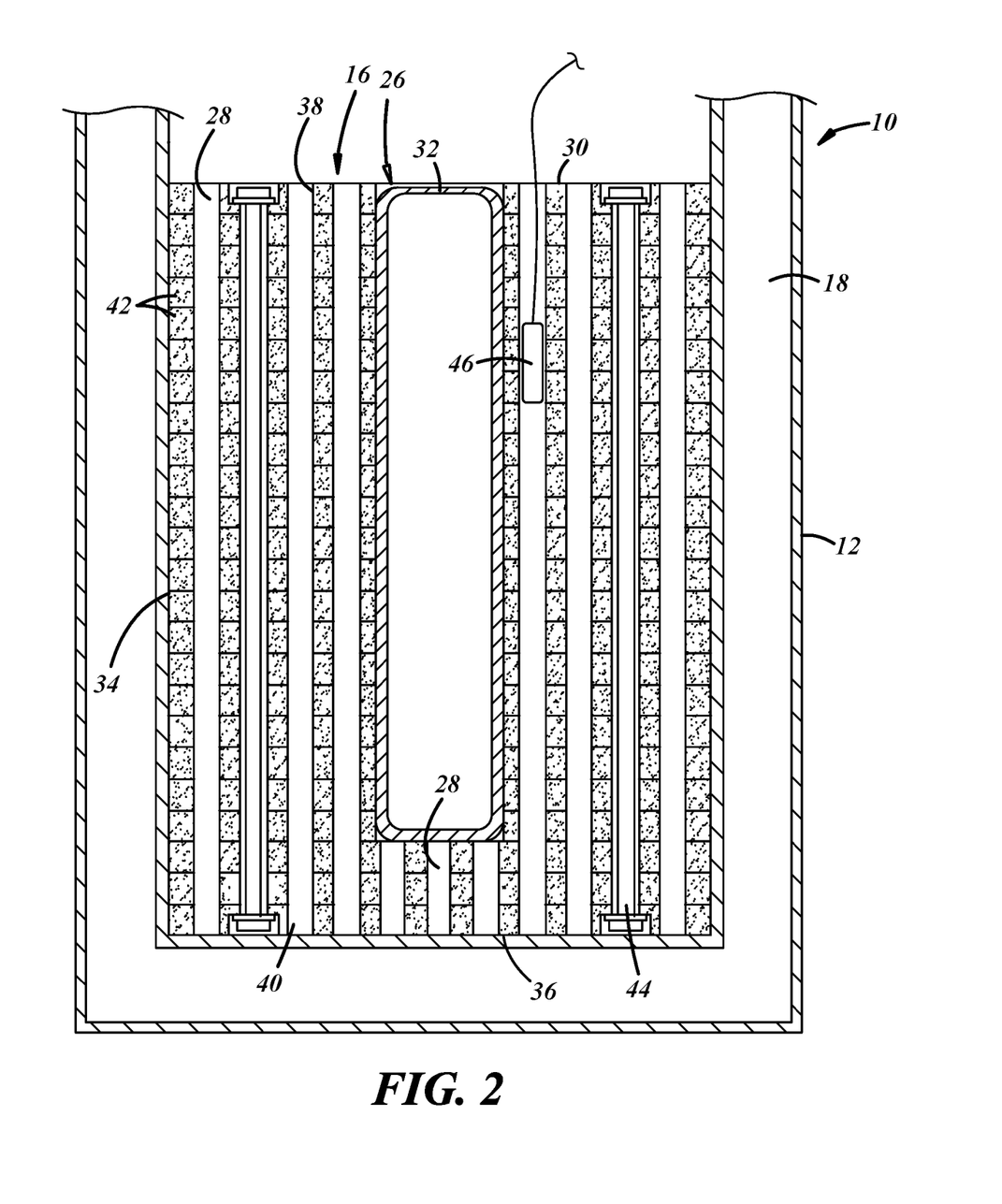
FIG. 2 is a cross-sectional view of the storage container of FIG. 1.

Each thermally insulated wall 18, and any other component described herein as thermally insulating, has an effective thermal conductivity less than or equal to 0.1 W/m·K. Examples of thermally insulating materials include expanded polystyrene (EPS) and polyurethane foam. Any thermally insulated component may also be super-insulating when its effective thermal conductivity is less than 0.02 W/m·K. As illustrated in FIG. 2, the base 12 may be constructed as an evacuated hollow metal shell, such as the bottom of a cryogenic dewar, to display super-insulating properties. Other examples of super-insulating walls include walls with an aerogel layer or certain microporous panels at atmospheric pressure or as part of vacuum panels.

A cryogenic fluid, or cryogen, is any gas that can be liquefied at −150° C. or less. A cryogen is liquid below its boiling point and gaseous above its boiling point. Liquid nitrogen ($LN_2$) is an example of a liquid cryogen and has a boiling point of −196° C. Other exemplary cryogens include helium, hydrogen, neon, oxygen, argon, krypton, air, and certain hydrocarbons, along with various combinations thereof. The cryogen can be introduced to the container 10 as a liquid to be absorbed by the absorbent core 16. Absorption of the liquid cryogen by the porous material of the core 16 may be referred to as charging the core or the container. The core 16 is considered fully charged when the porous material is completely saturated—i.e., when no more cryogen can be absorbed and the combined core and cryogen reaches its maximum weight. Once charged, the temperature within the storage cavity 26 can be maintained sufficiently close to the boiling point of the cryogenic fluid to preserve post-thaw viability of stored contents for several hours. For instance, with liquid nitrogen as the cryogenic fluid having a boiling point of −196° C., the storage cavity 26 can be maintained at about −150° C., which is a sufficiently low temperature for many life science products to be kept prior to use.

Core charging can be performed in different manners. In one example, a removable absorbent core 16 is immersed in the liquid cryogen until sufficiently charged, then removed from the liquid and placed in the container volume 20 before placement of the contents container 32 in the cavity 26. In another example, the liquid cryogen is introduced to the container volume 20, then an unsaturated core 16 is placed in the base 12 to begin absorbing the cryogen, after which the contents container 32 is placed in the storage cavity 26. In another example, the absorbent core 16 is already in place within the container volume 20, and the liquid cryogen is poured onto the core and into the container volume. Other temporal combinations are possible.

The porous material of the absorbent core 16 is any porous material capable of absorbing the liquid cryogen into its pores and allowing the cryogen to be released from its pores and into the storage cavity 16 or container volume 20 when the cryogen evaporates. This means the pore structure should be an open-cell structure in which the individual pores are interconnected throughout the material, and the pores should be small enough to provide sufficient capillary action to draw the liquid into the interior of the porous material. The porous material may be formed from an inorganic or other non-polymeric material. Certain polymeric foams may be unsuitable due to drastic changes in pore size that can occur due to high thermal expansion coefficients. The porous material may include an inorganic oxide, such as silica, or a mineral-derived material capable of withstanding extreme temperature changes without appreciable changes in the pore structure or in the size of the absorbent core, thereby avoiding problems with internal stresses that may be induced with other materials.

One suitable porous material is calcium silicate. Calcium silicate is conventionally used in high temperature insulation or fire-retarding applications but has surprisingly been found to provide a suitable porous configuration for absorption and release of cryogenic fluids such as liquid nitrogen. The porosity of the calcium silicate or other porous material may be about 90%. Another suitable porous material is an aerogel or microporous material, which can double as a super-insulating material. Aerogel materials can have porosities over 99%. The porous material may have a porosity of 75% or more, a porosity of 90% or more, or a porosity of 95% or more. Porous silicates other than calcium silicate may also be suitable.

Each of the fluid channels 28 is formed in the absorbent core 16, extending into the porous material from an open end at an outer surface 34 of the core. In the illustrated example, the outer surface 34 includes round planar surfaces at the first end 30 and an opposite second end 36 of the absorbent core 16, along with a cylindrical surface extending between the first and second ends. With reference to FIG. 2, each of the illustrated fluid channels 28 has opposite first and second ends 38, 40, both of which are open ends. Some of the fluid channels 28 extend the full length of the absorbent core 16 between its first and second ends 30, 36. The first end 38 of some of the fluid channels 28 is open to the storage cavity 26. In the illustrated configuration, all of the fluid channels 28 are perpendicular with the first and second ends 30, 36 of the absorbent core 16 —i.e., vertical in the orientation of the figures.

Figure 3:
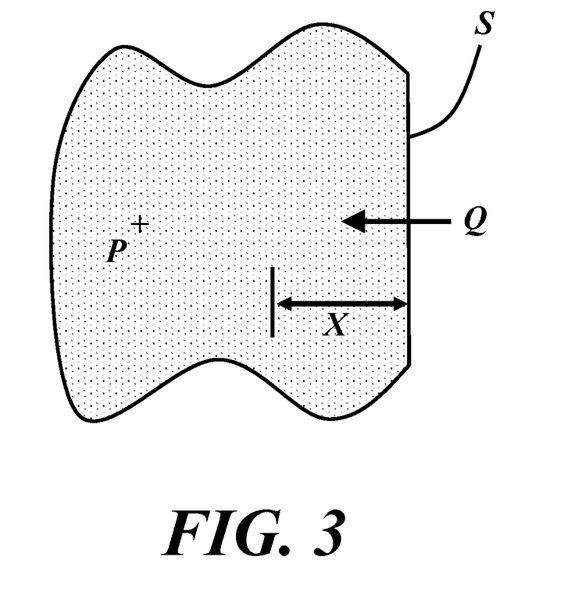
FIG. 3 is a schematic depiction of liquid cryogen absorption by a porous material.

The fluid channels 28 increase the surface area of the porous material that can be exposed to liquid cryogen for absorption thereinto. This reduces the amount of time required to charge the absorbent core 16 with the desired amount of liquid cryogen, which is a function of exposed surface area. But it is not increased surface area alone that is responsible for the reduction in charge time. Charge time has also been found to be a function of the spacing between exposed surfaces. Inclusion of the fluid channels 28 decreases the distance between exposed surfaces, thereby decreasing the charge time in a compounded manner. The effect is illustrated schematically in FIGS. 3 and 4. FIG. 3 illustrates a portion of porous material into which liquid cryogen is absorbed through an exposed surface (S) at its perimeter. The liquid effectively diffuses toward an inboard point (P) at an absorption rate (Q). But the absorption rate (Q) decreases with increasing distance (X) between the liquid front and the exposed surface (S)—i.e., once the liquid is absorbed into the porous material a certain distance, the capillary action is no longer strong enough to appreciably pull the entire length (X) of already absorbed liquid toward the open pores in the area of the inboard point (P).

Figure 4:
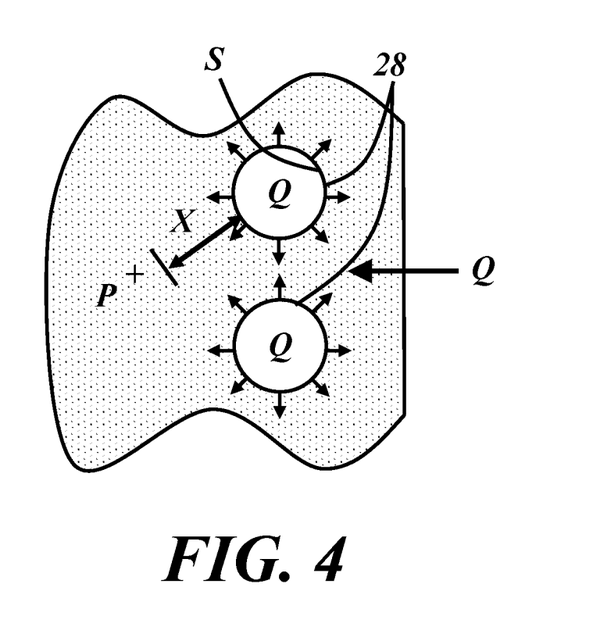
FIG. 4 is a schematic depiction of liquid cryogen absorption by a porous material with fluid channels.

As shown in FIG. 4, distributing fluid channels 28 along the porous material not only provides additional exposed surfaces (S), but it also effectively decreases the maximum value of (X) by decreasing the distance between any given inboard point (P) and an exposed absorption surface (S). The actual fluid absorption characteristics are more complex than illustrated in these two-dimensional representations, but they demonstrate the concept that distributing fluid channels throughout the absorbent core has multiple synergistic and compounded benefits related to decreased charge times. There is a limit and a trade-off to these benefits. For example, while increasing the number of fluid channels increases exposed surface area and can decrease the maximum distance between an exposed surface and any point within the porous material, each fluid channel also represents a reduction in the cryogen absorption capacity of the absorbent core. And if the distance between adjacent fluid channels is too small, the structural integrity of the core can also be reduced. All of these factors must be considered when selecting fluid channel size, spacing, orientation, etc. Exemplary relationships among fluid channels, surface areas, spacing, etc. are discussed further below.

With reference again to FIGS. 1 and 2, the absorbent core 16 may include a plurality of distinct panels 42 formed from the porous material. The panels 42 may be held together in a stacked configuration in the container volume 20 by a holder 44 or by the walls 18 of the container 10. In this example, the holder 44 is in the form of a pair of through-bolts or fasteners extending between opposite ends 30, 36 of the core 16 through a respective pair of the fluid channels 28. The holder 44 may be configured to independently maintain the stacked configuration of the panels 42, meaning that neither the walls 18 of the container 10 nor any other additional alignment structure is required for the panels to maintain their stacked configuration and/or their translational or rotational registration with one another. In other embodiments, the holder 44 includes a frame extending between the opposite ends of the core 16, such as thin wire or sheet metal straps extending along the outer surface 34 of the core and supporting the panels from the bottom. The holder 44 may include adhesive, snap features, pins, rods, or a sleeve, to list a few examples. In another example, the panels 42 may be fastened together by their own shape, such as a lip or other protrusion on one interfacial panel surface and a corresponding groove or recess on another interfacial panel surface. Such features may engage each other to restrict relative translational and/or rotational movement among engaged panels 42.

The illustrated configuration of fluid channels 28 is non-limiting. Some possible variations include: fluid channels 28 extending only partially through the absorbent core 16 or through only some of the panels 42, fluid channels opening elsewhere on the outer surface 34, fluid channels with closed ends within the core, fluid channels oriented parallel with or otherwise non-perpendicularly with the ends of the core, fluid channels having a curvilinear shape between opposite ends, fluid channels with a non-uniform cross-section along their lengths, fluid channels with cross-sectional areas that vary among the plurality of channels, non-circular fluid channels, fluid channels that intersect each other within the porous material, or any combination of these characteristics with the illustrated configuration.

FIG. 2 also illustrates a temperature sensor 46 embedded in the absorbent core 16.

The sensor 46 is in contact with the porous material of the core 16 and thus provides a more accurate indication of the temperature of the contents container 32, which is likewise in contact with the porous material, particularly when compared to temperature sensors suspended in an open cavity. The sensor 46 may be inserted into one of the fluid channels 28 as shown and supported in a manner that prevents contact with the contents container 32 to avoid damaging the contents container, which may be made from a plastic material that is fragile at cryogenic temperatures. The sensor 46 may be configured for wired or wireless communication with a data logger, display, or communication device to allow a user to access real-time or historical temperature information. In other embodiments the sensor 46 is a pressure sensor, a light sensor, an accelerometer, or other type of sensor that senses a characteristic indicative of container conditions. A power source such as a battery may be embedded in the core as well or housed in a recess formed in the core.

In some embodiments, the absorbent core 16 includes a sealant or sealing layer along at least a portion of the outer surface 34 and/or along surfaces of the storage cavity 26 to prevent unabsorbed liquid cryogen from contacting the contents container 32. In such embodiments, the contents container 32 could be placed in the cavity 26 while the cryogen is still being absorbed into the porous material along surfaces of the fluid channels 28.

Figure 5:
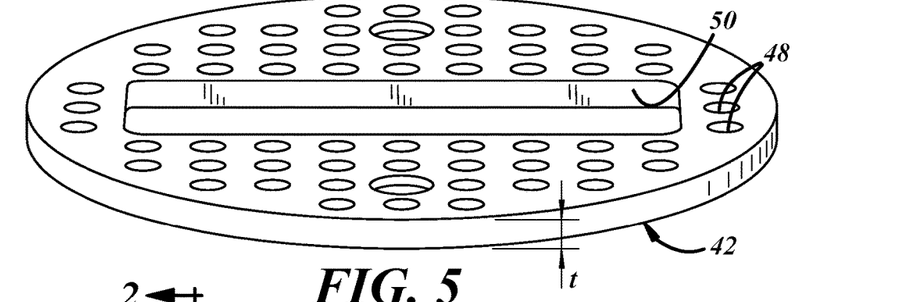
FIG. 5 is a top view of the absorbent core of FIG. 1.

FIG. 5 is a perspective view of one panel 42 of the plurality of panels of the absorbent core 16 of FIGS. 1 and 2. Each individual panel 42 has a plurality of spaced apart apertures 48 formed therethrough such that the apertures of each panel are aligned with apertures of an adjacent panel in the stack to define the fluid channels 28. Some of the individual panels 42 also have a storage cavity opening 50 formed therethrough such that the cavity opening 50 of each panel is aligned with the cavity opening of an adjacent panel in the stack to partly define the storage cavity 26. The storage cavity opening 50 may be omitted in one or more of the bottommost panels 42 in the stack, as illustrated in the cross-sectional view of FIG. 2. Each panel 42 is made from the porous material, and the perimetric edge of each panel forms a portion of the outer surface 34 of the absorbent core 16 when in the stacked configuration. Forming the absorbent core 16 from stacked panels 42 can further enhance liquid cryogen absorption via wicking of the cryogen along the interfaces between adjacent panels in the stack.

In the illustrated examples, each panel 42 is flat with opposite parallel planar surfaces and a uniform thickness, all of the panels of the core 16 are the same thickness, and all of the apertures are the same size and shape and are arranged in a uniform pattern. An exemplary panel thickness (t) may be less than 20% of the perimeter, less than 10% of the perimeter, or less than 7% of the perimeter. Possible panel variations include panels with a non-uniform thickness (e.g., a wedge shape), one or more panels having a different thickness from others, panels with curved or otherwise non-planar surfaces, panels with non-circular perimeters, one or more panels of the stack being affixed to the container lid 14, non-circular apertures 48, or apertures having sizes or shapes different from each other. One or more of the panels 42 may include a recess in place of an aperture or storage cavity opening to thereby form a closed end of a fluid channel or storage cavity.

Figures 6, 7:
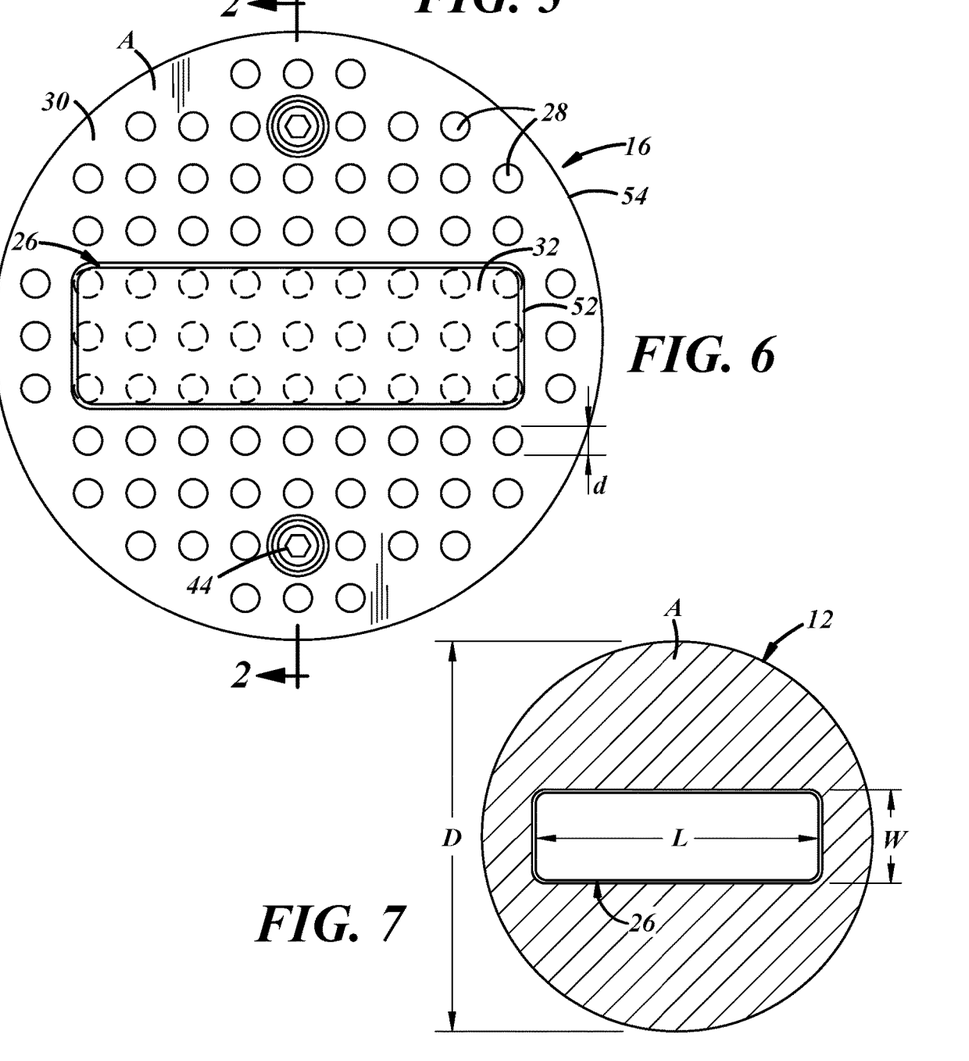
FIG. 6 is a perspective view of one of a plurality of panels of the absorbent core of FIG. 1.
FIG. 7 illustrates a non-cavity area of the absorbent core of FIG. 1.

FIG. 6 is a top view of the absorbent core 16 of FIG. 1 without the base or lid of the container 10 and illustrates the open ends of the fluid channels 28 at the first end 30 of the core, along with the contents container 32 fitted in the storage cavity 26. FIG. 6 also indicates the location of the cross-section of FIG. 2 through the pair of fasteners 44 and provides context for the following discussion regarding proportions of fluid channel sizes to non-cavity area.

A non-cavity area (A) of the absorbent core 16 is defined as the projected area between an outer perimeter 52 of the storage cavity 26 and an outer perimeter 54 of the core 16. The non-cavity area (A) thus includes all of the projected area within the perimeter 54 of the absorbent core other than that of the storage cavity 26. The non-cavity area (A) is labeled with cross-hatching in FIG. 7 for purposes of illustration. In the illustrated example, the non-cavity area (A) is equal to the area of a circle of diameter (D) minus the area of the storage cavity 26 (L×W in this example). In an example in which D=8 inches, L=5 inches, and W=2 inches, the non-cavity area (A) is equal to the total area within the perimeter 54 of the core ($16\pi$ in$^2$) minus the area of the storage cavity (10 in$^2$), or approximately 40 in$^2$.

The open ends of the fluid channels 28 are located in the non-cavity area (A) and are considered to be part of the non-cavity area. The total area of the open ends of the plurality of fluid channels 28 may be in a range from 5% to 25% of the non-cavity area (A). In a particular example, each of the fluid channels 28 has a diameter (d) of 0.25 inches and a corresponding cross-sectional area of about 0.050 in$^2$. With the illustrated quantity of sixty-two fluid channels 28 extend into the core 16 from its top end 30, the total area of the open ends of these fluid channels 28 is about 3.1 in$^2$, or about 8% of the non-cavity area (A) calculated above.

Each fluid channel 28 has an associated surface area along its length where the porous material of the absorbent core 16 is exposed. The surface area of each fluid channel 28 is equal to the product of its end-to-end length and its perimeter, assuming a constant cross-section. The combined surface area of all of the fluid channels can be very large in comparison with the non-cavity area (A) or projected area of the absorbent core 16. In some embodiments, the surface area along only a single fluid channel 28 is greater than 20% of the non-cavity area (A). Using the exemplary dimensions above, a single fluid channel of diameter d=0.25 inches has a surface area of about 9.5 in$^2$ when formed through 12 inches of porous material, which is nearly 25% of the non-cavity area (A) calculated above. With the illustrated quantity of fluid channels 28 extending the full length of the absorbent core 16 between its opposite ends 30, 36, the total surface area of the same diameter fluid channels is nearly 600 in$^2$, or a multiple of about 15 times the non-cavity area (A)—i.e., more than an order of magnitude.

The additional surface area provided by the fluid channels 28 can also be quantified in relation to the surface area of the storage cavity 26. In some embodiments the total surface area along all of the fluid channels is more than twice the surface area of the storage cavity 26. Again using the exemplary dimensions from above, and assuming a storage cavity depth of 10 inches, the combined surface area of the four sides and the bottom of the storage cavity is 140 in$^2$, making the total surface area along all of the fluid channels more than 4 times the surface area of the storage cavity 26. In other words, without the fluid channels, liquid cryogen poured into the storage cavity for absorption into the porous material would have access to less than a quarter of the amount of porous material surface area to be absorbed through. Further, as noted above in conjunction with FIGS. 3 and 4, once some of the cryogen is absorbed into the porous material, the affinity for more absorption is decreased, slowing the process. The presence of the fluid channels 28 provides greatly increased surface area and divides up the cryogenic material for absorption along distributed locations in the porous material.

In some embodiments, a conventional cryogenic dewar can be converted to a dry vapor shipper by inserting the disclosed absorbent core 16 in the hollow storage volume of the dewar where liquid cryogen is normally kept. Such a shipper can be made to comply with International Safe Transit Association (ISTA) shipping guidelines covering cryogenic material shipment. In this manner, the absorbent core 16 uses otherwise wasted volumetric space present in a conventional dewar by storing liquid cryogen in the porous material in that space. This enables a reduction of the physical size and weight of the shipping container. The absorbent core also enhances the temperature stability of the within the container since the contents container or payload is in direct contact with the porous material rather than being merely suspended in a gaseous cryogen environment in the container volume. This construction also uses less liquid cryogen than a conventional dewar capable of holding a similarly sized payload.

The removable and replaceable dewar-to-shipper conversion configuration also enables cleaning and sanitizing of the dewar after use so it can be safely reused. Dry vapor shippers with permanently attached absorbents are rendered unusable if a stored payload leaks or if the interior of the shipped is otherwise contaminated. Such permanently attached absorbent materials will absorb and harbor contaminants and can result in contamination of subsequently shipped or stored materials. With the disclosed absorbent core configured as a removable and replaceable component, a contaminated core can be discarded and replaced with a new core in a sanitized dewar, or the dewar can be sanitized and returned to use as a conventional dewar.

In some embodiments, the storage container 10 and associated absorbent core 16 are configured to fit in a secondary container that meets pressure and drop testing standards set forth in regulations that govern shipment of Category A infectious substances.

The illustrated example of the absorbent core 16 can be constructed in a relatively simple method that includes the steps of stacking solid panels of porous material together and using a common drilling tool to form the fluid channels through the stacked panels from the top to the bottom of the stack in a uniform pattern. The storage cavity 26 can be machined into the stacked panels either before or after the fluid channels, and the outer surface 34 can be machined before or after these steps if necessary to match the dimensions of the container volume 20.

The illustrated fluid channel pattern includes eighty-nine fluid channels, sixty-two of which extend the full length of the core, and twenty-seven of which are located along the bottom of the storage cavity. The illustrated pattern is arranged in evenly spaced rows and columns as part of an 11×11 array from which any fluid channels of the array that would be outside or too close to the perimeter of the core or too close to the storage cavity perimeter or storage cavity perimeter omitted. Each fluid channel 28 may be spaced at least one diameter from the perimeter of the absorbent core, for example, and the distance between adjacent fluid channels may range from 2 to 4 times their diameters, center-to-center.

The illustrated absorbent core 16 includes a quantity of twenty-four panels in the stack. Each panel may range in thickness from 0.25 inches to 2 inches. ½-inch thick calcium silicate board is one suitable material for the panels 42. The distance between opposite ends 30, 36 of the core 16 may range from about 6 inches to about 18 inches. In one embodiment, the absorbent core 16 includes twenty-four ½-inch thick panels and is 12 inches from end to end. In another embodiment, twelve 1-inch thick panels 42 are used to construct the same size core 16. In particular embodiments made to fit standard-sized dewars, the core 16 has a diameter of 8.5 inches or 7.25 inches but can be made in any size.

Figure 8:
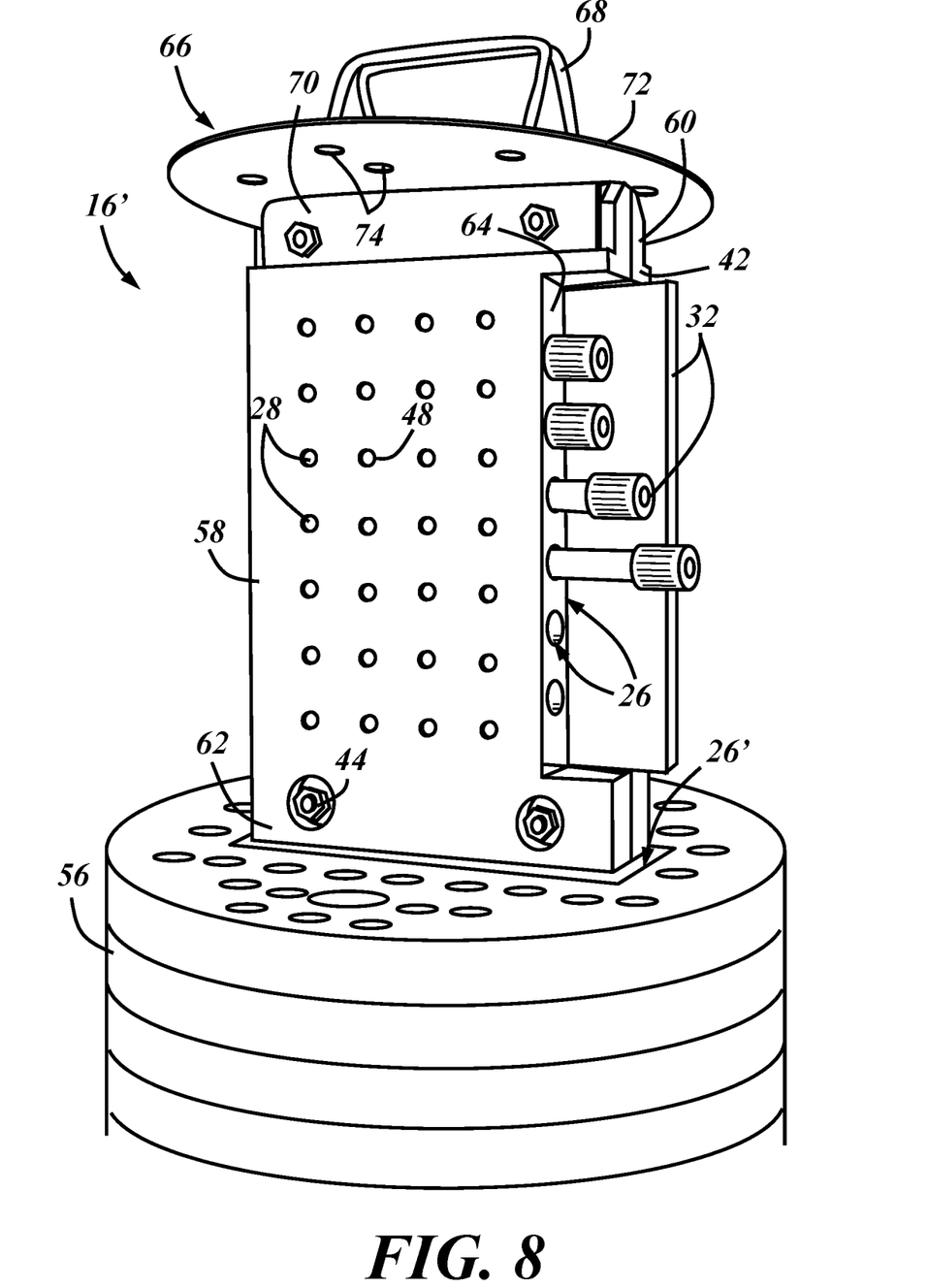
FIG. 8 is a perspective view of an embodiment of the absorbent core including an inner core and an outer core.

FIG. 8 illustrates an example of the absorbent core 16' that includes an outer core 56 and an inner core 58. The outer core 56 may be substantially identical to the absorbent core 16 illustrated in the previous figures and may include any compatible combination of the above-described features. The outer core 56 is configured to fit in a dewar or other storage container base as described above. The cavity 26' of the outer core 56 is configured such that the inner core 58 removably fits therewithin. The inner core 58 is formed from the porous material and can absorb and release cryogen as described above. One or more storage cavities 26 and fluid channels 28 are formed in the inner core 58. In the example of FIG. 8, a plurality of storage cavities 26 is formed in the inner core 58 with each storage cavity sized and shaped to securely hold and contain individual contents containers 32. The illustrated example includes several round storage cavities sized to securely and removably contain contents containers 32 in the form of tube-shaped vials and a larger elongated cavity sized to removably contain a cassette-shaped contents container. The contents containers 32 are shown only partially inserted in the corresponding storage cavities 26 in FIG. 8.

The storage cavities 26 are oriented to open along a side of the inner core 58 between opposite first and second ends 60, 62 so that the contents containers 32 are inserted and removed from the cavities in a direction different from that along which the inner and outer cores are engaged and disengaged—i.e., horizontally rather than vertically as oriented in FIG. 8. The fluid channels 28 open along the outer surface of the inner core 58 along the portion of the outer surface extending between the opposite ends 60, 62 and extend parallel with those ends (i.e. horizontally). In this example, both the inner and outer core 58, 56 include fluid channels that increase the surface area and cryogen absorption rate of the porous material. It is also contemplated that only one of the two parts 56, 58 of the core includes porous material and associated fluid channels. In some cases, the inner core 58 is the only absorbent core of the storage container.

The inner core 58 can be constructed and used in the same or similar manner as the outer core 56, and compatible features of the outer core are applicable to the inner core. For example, the inner core 58 may be constructed from a plurality of individual panels 42 of porous material and/or stacked and held together via a holder 44. In the illustrated example, the inner core 58 is constructed from a pair of panels 42, and the holder 44 includes a plurality of fasteners extending between opposite sides of the stacked panels. Apertures 48 are formed through each panel in a desired pattern to form the fluid channels 28. Fluid channel location, size, and spacing may be determined similar to those of the absorbent core of FIG. 1. Each of the illustrated panels 42 includes a cut-out 64 along one of the sides to provide manual access to grasp the contents containers 32 when in the storage cavities 26. The vial-type contents containers 32 can be inserted in the corresponding storage cavities 26 with a cap of the vial located in the cut-out 64. The storage cavities 26 configured for the vials extend in the same planar direction (i.e., horizontally) as the fluid channels 28 of the inner core 58 but are oriented perpendicular to the same fluid channels. Each of the vial storage cavities 26 is vertically offset from the fluid channels 28 so that a vial is held between each row of cavities 26.

These storage cavities 26 serve a double function as additional fluid channels along which liquid cryogen can be absorbed into the porous material. The inner core 58 can be charged with liquid cryogen in a manner similar to the above-described absorbent core 16 and the outer core 56, such as by immersion in the liquid cryogen before the contents containers 32 are placed in the cavities 26.

As illustrated in FIG. 8, the inner core 58 may be constructed as part of an extractor assembly 66, which includes the inner core and a handle 68 along the first end 60 of the inner core. The handle 68 is configured to allow manual removal of the inner core 58 and the contents containers 32 from the outer core 56 and container 10. The handle 68 may be configured to fold flat to fit beneath the container lid 14. The handle 68 may be attached to the inner core 58 via a bracket 70. The bracket 70 may be considered part of the holder 44 in embodiments where the bracket helps secure multiple panels 42 of the inner core 58 together as in FIG. 8.

The illustrated extractor 66 also includes a plate 72 along the first end 60 of the inner core 58. The handle 68 is attached to the bracket 70 via the plate 72 in this example. The plate 72 is sized and shaped to rest along the first end of the outer core 56 when the inner core 58 is received in the cavity 26' of the outer core and may serve several functions. The plate 72 provides attachment points for the handle, allowing those points to be spaced apart farther than the thickness of the inner core 58. The plate 72 also covers at least a portion of the open ends of the fluid channels of the outer core 56 and can thus prevent debris from falling into those channels and/or contain some of the gaseous cryogen within the fluid channels after it evaporates. The plate 72 may also act as a cryogen gas flow restrictor. For example, the plate 72 may include apertures 74 sized to permit less gaseous cryogen to escape from the outer core 56 than would otherwise escape from the open ends of the fluid channels while permitting enough gas to escape to avoid overpressurizing the storage container. The total area of the apertures 74 formed through the plate 72 may be in a range from 10% to 20% of the total area of the open ends of the fluid channels of the outer core 56, for example.

Figure 9:
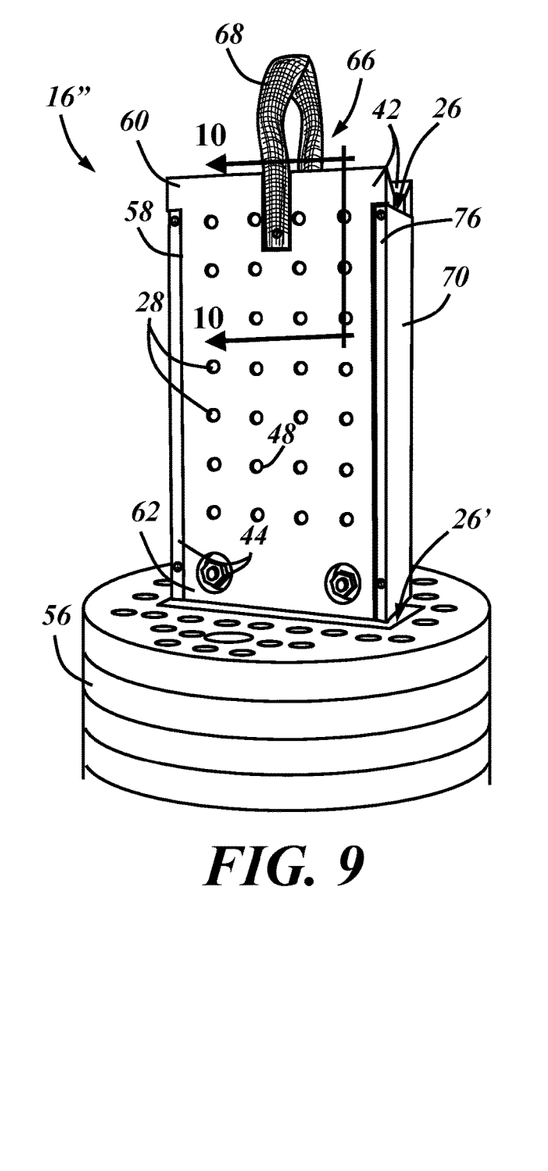
FIG. 9 is a perspective view of another embodiment of the absorbent core including an inner core and an outer core.
Figure 10:
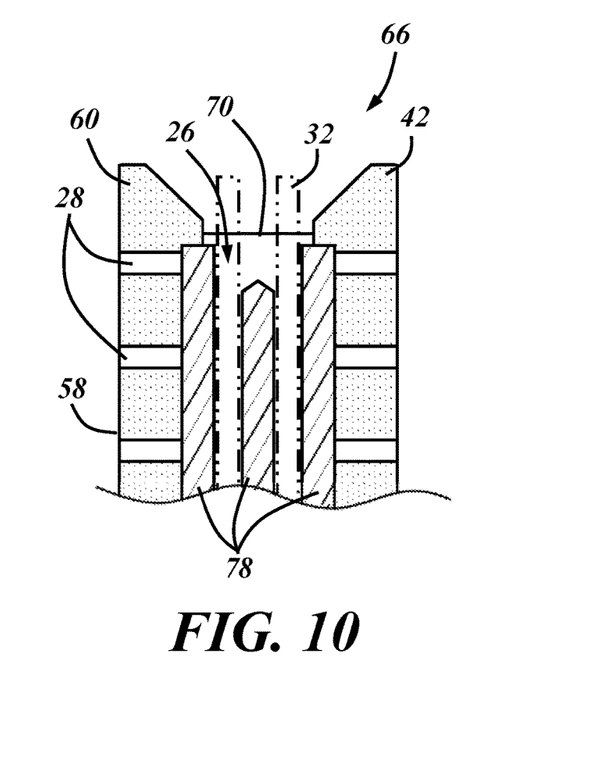
FIG. 10 is a cross-sectional view of the inner core of FIG. 9.

FIGS. 9 and 10 illustrates a variation of the absorbent core 16" that includes the outer core 56 of FIG. 8 and an inner core 58 as part of an extractor 66. The cavity 26' of the outer core 56 is configured such that the inner core 58 removably fits therewithin. The inner core 58 includes panels 42 of the porous material that can absorb and release cryogen as described above. One or more storage cavities 26 and fluid channels 28 are formed in the inner core 58, with the fluid channels being defined in the porous material. The example of FIGS. 9 and 10 includes a pair of top-loading storage cavities 26 formed along the first or top side 60 of the inner core 58 with each storage cavity sized and shaped to securely hold and contain individual cassette-type contents containers 32, which are depicted in phantom lines in FIG. 10. The fluid channels 28 open along the outer surface of the inner core 58 along the portion of the outer surface extending between the opposite ends 60, 62 and extend parallel with those ends (i.e. horizontally). In this example, both the inner and outer core 58, 56 include fluid channels that increase the surface area and cryogen absorption rate of the porous material. It is also contemplated that only one of the two parts 56, 58 of the core 16" includes porous material and associated fluid channels.

The inner core 58 can be constructed and used in the same or similar manner as the outer core 56, and compatible features of the outer core are applicable to the inner core. For example, the inner core 58 may be constructed from a plurality of individual panels 42 of porous material and/or stacked and held together via a holder 44. In the example of FIG. 9, the inner core 58 is constructed from a pair of panels 42, and the holder 44 includes a pair of fasteners extending between opposite sides of the panels that join the panels along the second or bottom end 62 of the inner core 58. Apertures 48 are formed through each panel in a desired pattern to form the fluid channels 28. Fluid channel location, size, and spacing may be determined similar to those of the absorbent core of FIG. 1 and the inner core of FIG. 8. The inner core 58 can be charged with liquid cryogen in a manner similar to the above-described absorbent core 16 and the outer core 56, such as by immersion in the liquid cryogen before the contents containers 32 are placed in the cavities 26.

As with the example of FIG. 8, the inner core 58 may be constructed as part of an extractor 66, which includes the inner core and a handle 68 along the first end 60 of the inner core. The handle 68 is configured to allow manual removal of the inner core 58 and the contents containers 32 from the outer core 56 and container 10. The handle 68 may be configured to fold flat to fit beneath the container lid 14 and/or lie along the first end 60 of the inner core 58. In the example of FIG. 9, the handle 68 is depicted as a woven textile (e.g., nylon) handle that can be manually extended for use and easily folded in on itself along the first end 60 of the inner core once placed in the storage container bottom before the lid is place over the container volume. The handle 68 may be attached to the inner core 58 via fasteners, as shown, or any other suitable means. In this example, opposite ends of the handle 68 lie in recesses formed in the panels 42 of porous material.

The illustrated extractor 66 includes a pair of brackets 70 on opposite transverse ends of the inner core 58. Each illustrated bracket 70 is U-shaped and extends between the opposite ends 60, 62 of the inner core 58 and between oppositely facing outer surfaces of the panels 42. Flanges 76 of each bracket fit into recesses formed along edges of the panels 42 of porous material, and each bracket 70 is attached to the panels 42 along the flanges 76 via fasteners or other suitable means. The brackets 70 may be considered part of the holder 44 in embodiments where the brackets help secure multiple panels 42 of the inner core 58 together as in FIG. 9. The brackets 70 may be formed from sheet metal (e.g., aluminum or stainless steel) or any other suitable material. In this example, the pair of brackets 70 also partly define the storage cavities 26 as end walls of the storage cavities.

In the embodiment of FIGS. 9 and 10, the extractor 66 also includes panels 78 formed from a shock absorbent material. The shock absorbent material may line and/or define a portion of the storage cavities 26. The illustrated example includes three shock absorbent panels 78. Two of these panels 78 fit into recesses formed in the panels 42 of porous material facing the storage cavities 26, and one of the panels 78 is between the other two as a divider between the two storage cavities 26. One suitable material for the shock absorbent panels 78 is expanded polystyrene (EPS), though other similarly expanded polymeric materials and/or other non-metallic and non-mineral-based materials can also be used. One or more of the panels 42 of porous material and the shock absorbent panels 78 may include bevels or chamfers to help guide the contents containers 32 into the desired storage cavity. In the illustrated example, both of the panels 42 of porous material along with the central panel 78 of shock absorbent material include beveled edges along panel ends at the first end of the inner core 58.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A dry vapor cryogenic storage container, comprising:
   one or more thermally insulated walls that together partly define a closable container volume having an open end and an opposite closed end;
   an absorbent core housed in the container volume, the absorbent core comprising a porous material that absorbs a cryogenic material in liquid form and releases the cryogenic material in vapor form as the absorbed liquid evaporates;
   a storage cavity formed in the absorbent core, the storage cavity being sized and shaped to hold a contents container in contact with the porous material such that the contents container remains stationary within the storage cavity when the orientation of the absorbent core changes;
   a plurality of fluid channels formed in the absorbent core, each fluid channel having an open end at an outer surface of the absorbent core and extending into the porous material, whereby liquid cryogenic material in the container volume is absorbed into the porous material through fluid channel surfaces.

2. The dry vapor cryogenic storage container of claim 1, wherein the absorbent core comprises a plurality of panels formed from the porous material, the panels being held together in a stacked configuration in the container volume, each panel having a plurality of apertures formed therethrough such that the apertures of each panel are aligned with apertures of an adjacent panel to define at least portions of the plurality of fluid channels.

3. The dry vapor cryogenic storage container of claim 2, wherein each panel has a storage cavity opening formed therein such that the storage cavity opening of each panel circumscribes and partly defines the storage cavity.

4. The dry vapor cryogenic storage container of claim 2, wherein the absorbent core further comprises a holder extending from a first end of the absorbent core to an opposite second end of the absorbent core, the holder being configured to independently maintain the stacked configuration of the plurality of panels.

5. The dry vapor cryogenic storage container of claim 4, wherein the holder includes one or more fasteners extending between the first and second ends of the absorbent core through aligned apertures of the plurality of panels.

6. The dry vapor cryogenic storage container of claim 1, wherein the porous material is calcium silicate.

7. The dry vapor cryogenic storage container of claim 1, wherein each of the plurality of fluid channels is formed in a non-cavity area of the absorbent core defined between an outer perimeter of the storage cavity and an outer perimeter of the absorbent core, a total area of the open ends of the fluid channels being in a range from 5% to 25% of the non-cavity area.

8. The dry vapor cryogenic storage container of claim 7, wherein a surface area along one of the fluid channels is greater than 20% of the non-cavity area.

9. The dry vapor cryogenic storage container of claim 7, wherein a combined surface area along all of the plurality of fluid channels is at least an order of magnitude greater than the non-cavity area.

10. The dry vapor cryogenic storage container of claim 1, wherein a combined surface area along all of the plurality of fluid channels is at least twice a surface area of the storage cavity.

11. The dry vapor cryogenic storage container of claim 1, wherein the absorbent core is a removable and replaceable component of the storage container.

12. The dry vapor cryogenic storage container of claim 1, wherein the storage cavity is lined with a shock absorbent material.

13. The dry vapor cryogenic storage container of claim 1, further comprising a temperature sensor embedded in the absorbent core.

14. The dry vapor cryogenic storage container of claim 1, wherein at least one of the fluid channels has an open end at the storage cavity.

15. The dry vapor cryogenic storage container of claim 1, wherein the absorbent core comprises an outer core with a cavity formed therein and an inner core formed from the porous material that removably fits within the cavity of the outer core, the storage cavity and at least some of the fluid channels being defined in the inner core.

16. The dry vapor cryogenic storage container of claim 15, wherein both of the inner and outer cores include the porous material and have at least some of the fluid channels formed therein.

17. The dry vapor cryogenic storage container of claim 16, wherein the fluid channels formed in the inner core are perpendicular with the fluid channels formed in the outer core.

18. The dry vapor cryogenic storage container of claim 15, further comprising an extractor that includes the inner core and a plate attached at an end of the inner core, wherein the plate is in contact with an end of the outer core when the inner core is in the cavity of the outer core.

19. The dry vapor cryogenic storage container of claim 1, wherein the storage cavity is one of a plurality of storage cavities configured to hold individual contents containers in contact with the porous material. such that each contents container remains stationary within the corresponding storage cavity when the orientation of the absorbent core changes.

20. A dry vapor cryogenic storage container, comprising: a base having super-insulated walls;
a lid that fits on the base, wherein the base and lid together define a container volume of the storage container;
an outer core sized and shaped to fit within the container volume such that an outer surface of the outer core is in contact with the super--insulated walls and such that the outer core remains stationary within the container volume when the orientation of the storage container changes, wherein the outer core has a cavity facing the lid;
an extractor comprising an inner core and a handle attached at an end of the inner core, wherein the inner core is sized and shaped to removably fit within the cavity and the handle is foldable to lie flat along the top of the inner core when the inner core is in the cavity;
a storage cavity formed in the inner core, the storage cavity being sized and shaped to hold a contents container in contact with the inner core such that the contents container remains stationary within the inner core when the orientation of the inner core changes,
wherein one or both of the inner and outer cares comprise a panel of porous material that absorbs a cryogenic material in liquid form and releases the cryogenic material in vapor form as the absorbed liquid evaporates, and
wherein a plurality of fluid channels is formed in the porous material, each fluid channel having an open end at an outer surface of one of the cores, whereby liquid cryogenic material is absorbed into the porous material through fluid channel surfaces.

21. The dry vapor cryogenic storage container of claim 1, wherein the absorbent core has a close fit with the thermally insulated walls.

22. The dry vapor cryogenic storage container of claim 1, wherein the absorbent core is sized and shaped to fit within the container volume and to contact the thermally insulated walls.

23. The dry vapor cryogenic storage container of claim 1, wherein the absorbent core is essentially the same size and shape as the container volume.

* * * * *